ILLUMINATING ATTACHMENT FOR TELEPHONES

Filed June 8, 1950

INVENTOR

MARIE K. LAPORTE

BY Shepherd Campbell

ATTORNEYS

UNITED STATES PATENT OFFICE 2,572,815

ILLUMINATING ATTACHMENT FOR TELEPHONES

Marie K. Laporte, Arlington, Va.

Application June 8, 1950, Serial No. 166,945

15 Claims. (Cl. 179—179)

This invention relates to illuminating attachments for telephones of the general nature of the attachments shown in my co-pending applications Serial Numbers 134,242, now abandoned, 134,243, now Patent No. 2,560,653, granted July 17, 1951, both filed December 21, 1949, and 137,200 filed January 6, 1950. The present application is filed as continuation-in-part, of the aforesaid applications and especially of Serial No. 137,200.

Application Serial No. 134,242 discloses means for lighting a light when the telephone bell rings. Howeved, the structure there shown is energized from the main bell ringing circuit of the telephone. The installation of a device of that sort requires more skill and electrical knowledge than is possessed by the average person and in addition the telephone companies look with a high degree of disfavor upon any attachment which connects with the conventional telephone circuits.

Application Serial No. 134,243 discloses a lighting circuit which is closed by the act of removing the handset receiver from the hook. While this serves to give the desired illumination after the person answering the phone reaches the phone, it gives no illumination to aid a person seeking to answer the phone in a dark room or hall. Further it is of no help to deaf persons who cannot hear the bell ring in the first place and who consequently never feel impelled to lift the receiver from the hook.

Application Serial No. 137,200, like the present application functions to energize a lighting circuit under the influence of the sound of the telephone bell, so that a person answering the call does not fall over objects or suffer barked shins in reaching the telephone and so that a deaf person can see that a call is being made even though he cannot hear the bell. However, in application Serial No. 137,200 the light remains lighted until manually extinguished and thus, if there is no one at home to answer the call the lamp will remain lighted indefinitely. This is not only undesirable from the standpoint of waste of current and burning out of lights but it notifies peeping Toms of burglarous intent that there is no one at home. It is therefore the primary purpose of the present invention to provide a lighting attachment for telephones arranged to be lighted by the sound waves of the telephone bell and independently of the conventional bell ringing circuit, and wherein the circuit will be automatically broken, the light extinguished and the parts reset, after a predetermined period of time.

While electronic devices for picking up and amplifying sound waves to operate switches are in daily use in radio and public address system arts, and while it is within the scope of my invention to employ a vacuum tube pickup of the sound of a bell and to cause the produced current to control a switch in a lighting circuit, I prefer to employ a mechanical structure such as a vibrating reed to close the lighting circuit. The apparatus may utilize the regular house current and be plugged into any convenient socket. However, I may also employ a small battery and bulb of the flash light type as shown in Serial No. 134,243, the difference in invention being in no way dependent upon the particular source of current employed but rather upon the provision of means over 134,243 for lighting the light when the bell rings and for extinguishing the light if no one responds within a reasonable length of time.

While I preferably mount the mechanism described upon the plastic shell so that the mechanism becomes properly placed by the mere act of slipping the shell upon the telephone the invention is not limited to such an arrangement because the component parts such as the light upon the one hand and the circuit closing mechanism upon the other hand may be in separate casings so that the light may be set on a table by the phone while the vibrating reed may be placed close to the telephone bell, when the latter is not reasonably close to the telephone proper. The vibrating reed and its associated parts constitute in effect a sound powered switch and I may substitute any suitable sound powered switch adapted to close the lighting circuit under the influence of the sound waves from the telephone bell.

Figure 1:
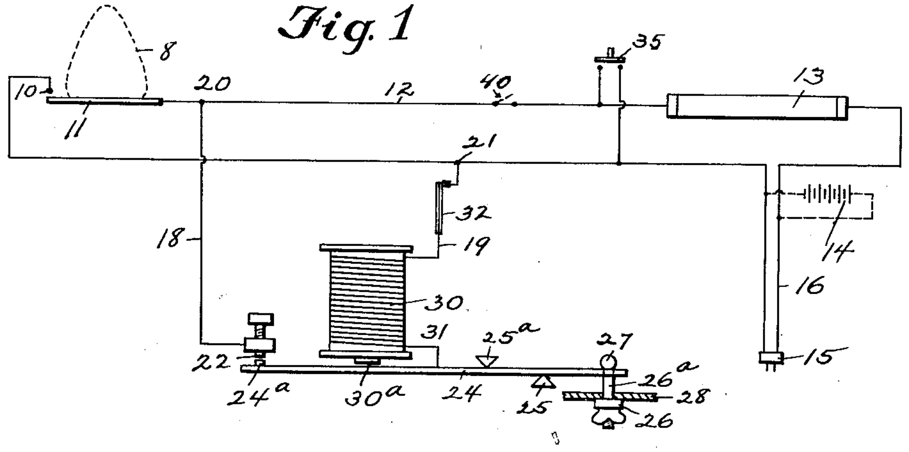
Fig. 1 is a diagrammatic view of the electric circuit and associated parts.
Figure 2:
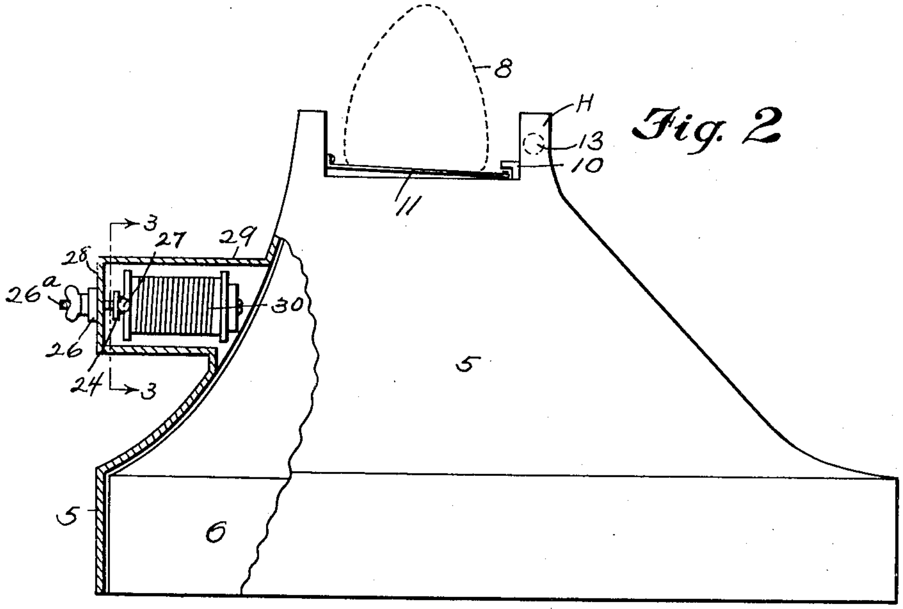
Fig. 2 is a view partly in elevation and partly in section of a plastic decorative covering shell for a telephone showing one embodiment of the invention.
Figure 3:
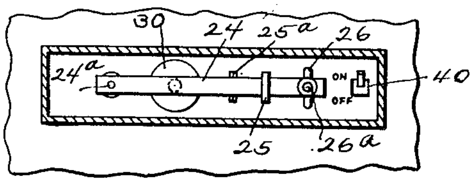
Fig. 3 is a sectional view on line 3—3 of Fig. 2.

Like numerals designate corresponding parts in all of said figures. In the form of the invention which I have chosen for purposes of illustration, 5 designates a relatively thin and somewhat elastic shell of molded plastic, shaped and dimensioned to be slipped over the base 6 of a conventional telephone hand set. The conventional combined transmitter and receiver arm is indicated in dotted lines at 8. Secured to shell 5 is a fixed contact piece 10, which, with a spring contact strip 11 constitutes a switch which closes a circuit 12 whenever the receiver-transmitter arm is lifted from the base. A small electric light 13 and a source of E. M. F. are included in circuit 12. Thus the light will be lighted when the receiver is lifted and will remain lighted until contact strip 11 is depressed by the act of restoring the receiver arm to its inactive position. The source of power for light 13 may be a small flash light battery indicated at 14 or the circuit may be energized from a house lighting circuit through a conventional plug 15 and extension wires 16.

The light bulb may be a conventional hand flash light bulb or it may be a small neon tube. A branch circuit comprises wires 18 and 19 which are connected into circuit 12 at 20 and 21. The wire 18 leads to a contact point 22 which is located close to the side of the outer or free end of a vibratory metallic reed 24. The inner end portion of this vibratory reed is adapted to be bound more or less forcibly against spaced bearing knife edges 25 and 25*a* by the action of a tensioning thumb nut 26. This nut has threaded engagement with a link 26*a* which passes through the reed and carries a ball head 27. 28, Fig. 1 designates the wall of a casing 29 that is preferably integral with shell 5 and within which these described parts may be housed. The nut 26 thrusts against this wall in drawing upon the ball head 27, to tension and tune the reed 24. Current from wire 18 passes through a part of reed 24 to the windings of an electromagnet 30 said windings being connected to reed 24 at 31. Wall 28 may be a partly open or perforate one to admit sound waves.

When by the ringing of the telephone bell, to which the reed has been attuned, the reed is vibrated, its outer end contact 24*a* momentarily touches contact 22. That portion of the reed between 22 and 31 is of conductive material and thus the magnet is energized. The energized core 30*a* of the magnet acts to hold the circuit closed long enough for a person answering the call to get to the phone. When the receiver is lifted from the hook an additional and independent circuit for keeping the lamp lighted, will be completed.

However, if by reason of the absence of the occupants of the house, no one answers the phone, the light will be automatically extinguished after the lapse of a determined period of time by the opening of what is in effect a thermal switch consisting of a conventional bimetallic thermal strip 32 that is included in the length of conductor 18 between the magnet and point 21.

When the circuit is interrupted by the opening of the thermal strip the light will be extinguished and the vibrator reed 24 will return to its neutral position (at which time it contacts with neither 22 nor core of magnet 30). When the strip 32 cools, closes and completes the circuit the parts will have been automatically reset preparatory to repeating the operation. A manually operated switch 35 may serve to close the circuit and light the light for any desired length of time after the thermal switch would otherwise have operated to extinguish it. An in series switch 40 operates to cut the whole apparatus out of action when desired.

Figure 4:
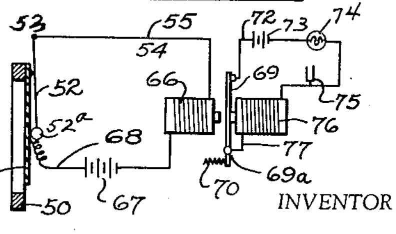
Fig. 4 shows a modified form of circuit.

In Fig. 4 I have illustrated a modified structure which differs from Fig. 1 in that instead of the vibration of a vibratory member closing a circuit, such vibration is caused to open an auxiliary circuit to deenergize a magnet, the armature of which then moves to close the main circuit in which a light is included. In Fig. 4 a frame 50 is spanned by a vibrating member 51 which may be a diaphragm or a reed. A pendulum 52 pivoted to swing from pivot 53 lies merely slightly off vertical so that a ball 52*a* on the lower end of the pendulum may rest lightly and gravitally upon the central portion of the vibratory member 51. When this member vibrates an auxiliary circuit 54 is broken, said circuit including pendulum 52, lead 55, electromagnet 66, source of E. M. F. 67, wire 68 and member 51 back to the ball on the end of the pendulum. An armature 69 which is pivoted at 69*a* is biased by a spring 70 away from the core of magnet 66. Frame 50 may be tilted to more nearly parallel the pendulum, if desired. Until the auxiliary circuit is broken magnet 66 is energized and holds armature 69 toward the left in Fig. 4. When member 51 is vibrated by the ringing of the telephone bell, ball 52*a* is kicked away from said member far enough to break the auxiliary circuit, whereupon magnet 66 is deenergized and armature 69 is moved by spring 70 to close the main circuit which then includes conductor 72, source of current 73, light 74, bimetallic thermal strip 75, electromagnet 76, conductor 77, and armature 69. Magnet 76 being then energized maintains the circuit closed until the thermal delay switch 75 heats up and opens the circuit. Thereupon deenergization of magnet 76 permits armature 69 to be drawn into engagement with the core of magnet 66 which by that time has again been energized by the cessation of the vibration of member 51.

The light may be placed at any desired position on the shell but is placed where it will best illuminate the dial, and serve the purpose of general illumination of the phone area for the taking of notes, etc. I find the space between the two receiver horns H at the front side of the shell to be a desirable place in which to locate the light as suggested in my application Serial No. 134,242.

It is to be understood that the invention is not limited to the precise construction set forth herein but that it includes within its purview whatever changes fairly come within either the terms or the spirit of the appended claims.

Having described my invention what I claim is:

1. An attachment for a desk type dial telephone of the kind having a conventional electric call bell and circuit therefor; an additional electric circuit that is independent of the conventional bell ringing circuit, a light and a source of electric power for lighting said light both included in said independent circuit, a sound responsive element, responsive to the sound of said signal bell, means under control of the sound responsive element for closing the independent circuit to light the light when the bell rings and time-delay means in said independent circuit constructed to interrupt the same to extinguish the light after a determined lapse of time.

2. An attachment for a desk type dial telephone of the kind having a conventional electric call bell and circuit therefor; an additional electric circuit that is independent of the conventional bell ringing circuit, a light and a source of electric power for lighting said light both included in said independent circuit, a sound responsive element, responsive to the sound of said signal bell, means under control of the sound responsive element for closing the independent circuit to light the light when the bell rings, said sound responsive element including a vibratory reed, vibrated from a neutral to a circuit closing position in said circuit by the ringing of the bell, and time-delay means in said independent circuit constructed to interrupt the same to extinguish the light after a determined lapse of time.

3. An attachment for a desk type dial telephone of the kind having a conventional electric call bell and circuit therefor; an additional electric circuit that is independent of the conventional bell ringing circuit, a light and a source of electric power for lighting said light both included in said independent circuit, a sound responsive element, responsive to the sound of said signal bell, means under control of the sound responsive element for closing the independent circuit to light the light when the bell rings, said sound responsive element including a vibratory reed, vibrated from a neutral to a circuit closing position in said circuit by the ringing of the bell, the time-delay means including a thermally actuated switch moving after a current flow of a determined length of time, to break the said circuit.

4. An attachment for a desk type dial telephone of the kind having a conventional electric call bell and circuit therefor; an additional electric circuit that is independent of the conventional bell ringing circuit, a light and a source of electric power for lighting said light both included in said independent circuit, a thermal switch in said independent circuit, a sound responsive element, responsive to the sound of said signal bell, means under control of the sound responsive element for closing the independent circuit to light the light when the bell rings, said sound responsive element including a vibratory reed, vibrated from a neutral to a circuit closing position in said circuit by the ringing of the bell, means tending to move the reed to neutral position the circuit closing means including the vibratory reed which moves from its neutral to a circuit completing position in closing the circuit means for holding the reed in circuit completing position as long as the thermal switch is closed, the action of the thermal switch in opening the circuit permitting the said reed to return to its neutral position.

5. A structure as recited in claim 1 in combination with circuit forming means in which the same light and source of power are included, the latter circuit forming means including a switch disposed in the path of movement of the handset receiver, said switch being constructed to close the circuit when the receiver is lifted from its position of rest, whereby to maintain the light lighted after the time delay means opens its controlled circuit after a lapse of time.

6. A structure as recited in claim 1 in combination with circuit forming means in which the same light and source of power are included, the latter circuit forming means including a switch disposed in the path of movement of the handset receiver, said switch being constructed to close the circuit when the receiver is lifted from its position of rest, whereby to maintain the light lighted after the time delay means opens its controlled circuit after a lapse of time and an additional manually operated switch and connections therefrom arranged to control the light from its source of E. M. F. independently of all the other circuit controlling devices named.

7. The combination with a circuit, including means for connecting it to a source of electricity, an electric light and a telephone receiver controlled switch in said circuit, of means for bridging and closing said circuit independently of said switch, said means including a sound responsive, vibrating, metallic reed, a contact arranged to be engaged by said reed when the latter is vibrated, an electromagnet for which said reed forms an armature and which magnet attracts and holds the reed out of its normal neutral and in circuit closing position as long as said magnet is energized, said contact being disposed adjacent said reed and being connected to one side of the circuit, said magnet including windings connected to the other side of the circuit and a bimetallic strip constituting a thermal switch forming a part of the connection through which the magnet is energized when the reed is vibrated, the connections to the last named side of the circuit including a part of the reed and the magnet windings.

8. A structure as recited in claim 1 in combination with a lightweight, ornamental shell constructed to closely conform to the contour of a telephone base and wherein said shell is provided with an offset, box-like extension within which the sound responsive element and its associated parts are housed.

9. A structure as recited in claim 7 in combination with a plastic shell shaped to conform closely to and to snap on to a telephone base, said shell being formed with an offset integral housing for receiving the vibratory reed and magnet, said shell also carrying the receiver controlled switch, whereby the act of snapping the plastic shell in place mounts all the parts in operative relation to the telephone handset.

10. An attachment for a dial telephone of the kind having a conventional call bell and circuit therefor, comprising an auxiliary electric circuit independent of the bell circuit of the call bell, a vibratory member tuned to respond to said signal bell and said auxiliary circuit including an electromagnet, a source of power and a member mounted in position to be actuated by the vibratory member to break the auxiliary circuit and deenergize its electromagnet, a main circuit including an electro-magnet, a time delay switch, a light disposed in position to illuminate the telephone dial, a source of power and an armature coacting with both of said magnets, said armature when released by the deenergization of the magnet of the auxiliary circuit moving to close the main circuit to energize the magnet of the latter circuit, said latter magnet holding the main circuit closed until it is opened independently of said armature and by said time delay switch.

11. An attachment for a dial telephone of the kind having a conventional signal call bell and circuit therefor comprising an auxiliary electric circuit independent of the bell circuit of the call bell, a vibratory member tuned to respond to said signal bell and said auxiliary circuit including an electro magnet, a source of power and a member mounted in position to be actuated by the vibratory member to break the auxiliary circuit and deenergize its electromagnet, a main circuit including an electromagnet, a time delay switch, a light disposed in position to illuminate the telephone dial light, a source of power and an armature coacting with both of said magnets, said armature when released by the deenergization of the magnet of the auxiliary circuit moving to close the main circuit to energize the magnet of the latter circuit, said latter magnet holding the main circuit closed until it is opened independently of said armature and by the time delay switch, a thin plastic shell shaped and dimensioned to fit snugly over the base of a telephone and means for mounting all of the mechanism recited, upon said shell so that by the act of placing the shell upon the base the light is brought into illuminating position with respect to the dial of the telephone and the vibratory member is brought into operative position with respect to the signal bell.

12. A structure as recited in claim 1 wherein the time-delay means is a thermally actuated element which opens the main circuit after current flow during a determined length of time heats the same, the circuit being closed and the parts reset upon cooling of the delay element.

13. The combination with a telephone of the handset dial type and its conventional electric signal call bell, of an electric circuit that is independent of the conventional bell ringing circuit and which independent circuit includes a light and a source of electric power for energizing said light, a vibratory sound responsive element set to be responsive to the sound waves emanating from the call bell of the telephone included in said circuit, a support for said vibratory element and the light so mounted upon the telephone as to bring the vibrating element into operative relation to the source of the call bell sound waves and to bring the light into position to overlie and illuminate the dial of the telephone and to partly illuminate the room in which the telephone is located, an electro-magnet for which said vibratory element constitutes an armature and the windings of which are serially included in said independent circuit, a thermal delay switch also included in said circuit, circuit closing means carried by the vibratory element serving to initially complete the circuit and energize the magnet when said element is vibrated by the ringing of the call bell, said magnet thereafter holding the vibratory element in circuit closing position to light the light until the thermal delay switch opens to break the circuit, and tensioning means for the vibratory element set to cause the element to respond to the call bell and also to move to circuit breaking position to reset the parts for a subsequent operation after one operation of the structure.

14. In an illuminating attachment for the dials of desk type dial telephones which have a conventional call bell and circuit therefor, a relatively thin plastic shell dimensioned to fit upon the base of such a telephone, and carrying elements to constitute an auxiliary electric circuit that is wholly independent of the call bell circuit of the telephone, an electric light in said circuit positioned to illuminate the dial of the telephone when said shell is placed on said base, a vibratory sound responsive element also carried by said shell tuned to respond to sound waves emanating from the call bell, circuit closing means included in said circuit and operated by said vibratory element to close said circuit when the call bell sounds and actuates the vibratory element, means tending to move the vibratory element to circuit breaking position, means for holding the vibratory element in circuit making position as long as the circuit is closed, means for supplying electric current to said circuit, and a thermal switch in said circuit constructed to break said circuit after a determined length of energization of the said electric light, the application of the shell to the base bringing the vibratory element into operative relation to the call bell and also bringing the electric light into position to illuminate the said dial.

15. A structure as recited in claim 14 in combination with a receiver-transmitter handset controlled switch included in said circuit and mounted upon the shell in position to be engaged by the transmitter-receiver handset and constructed to break the circuit when the handset is placed upon the base and to make the circuit to cause the electric light to light when the handset is lifted for use, said handset controlled switch being constructed to maintain the circuit closed whenever it is lifted for use and independently of the vibratory member.

MARIE K. LAPORTE.

REFERENCES CITED

The following references are of record in the file of this patent:

UNITED STATES PATENTS

| Number | Name | Date |
|---|---|---|
| 1,055,985 | Berger | Mar. 11, 1913 |
| 1,310,568 | Heap | July 22, 1919 |
| 1,841,733 | Hershey | Jan. 19, 1932 |
| 1,864,910 | Jewell | June 28, 1932 |
| 1,872,372 | Wensley | Aug. 16, 1932 |
| 1,973,081 | Keiser | Sept. 11, 1934 |
| 2,073,587 | Parissi | Mar. 9, 1937 |
| 2,161,416 | Heck | June 6, 1939 |
| 2,428,007 | Boardman | Sept. 30, 1947 |
| 2,435,370 | Speer | Feb. 3, 1948 |
| 2,442,988 | Satz | June 8, 1948 |
| 2,473,775 | Allen | June 21, 1949 |
| 2,522,701 | Bostany | Sept. 19, 1950 |
| 2,522,726 | Shuetz | Sept. 19, 1950 |